United States Patent Office 2,939,936
Patented June 7, 1960

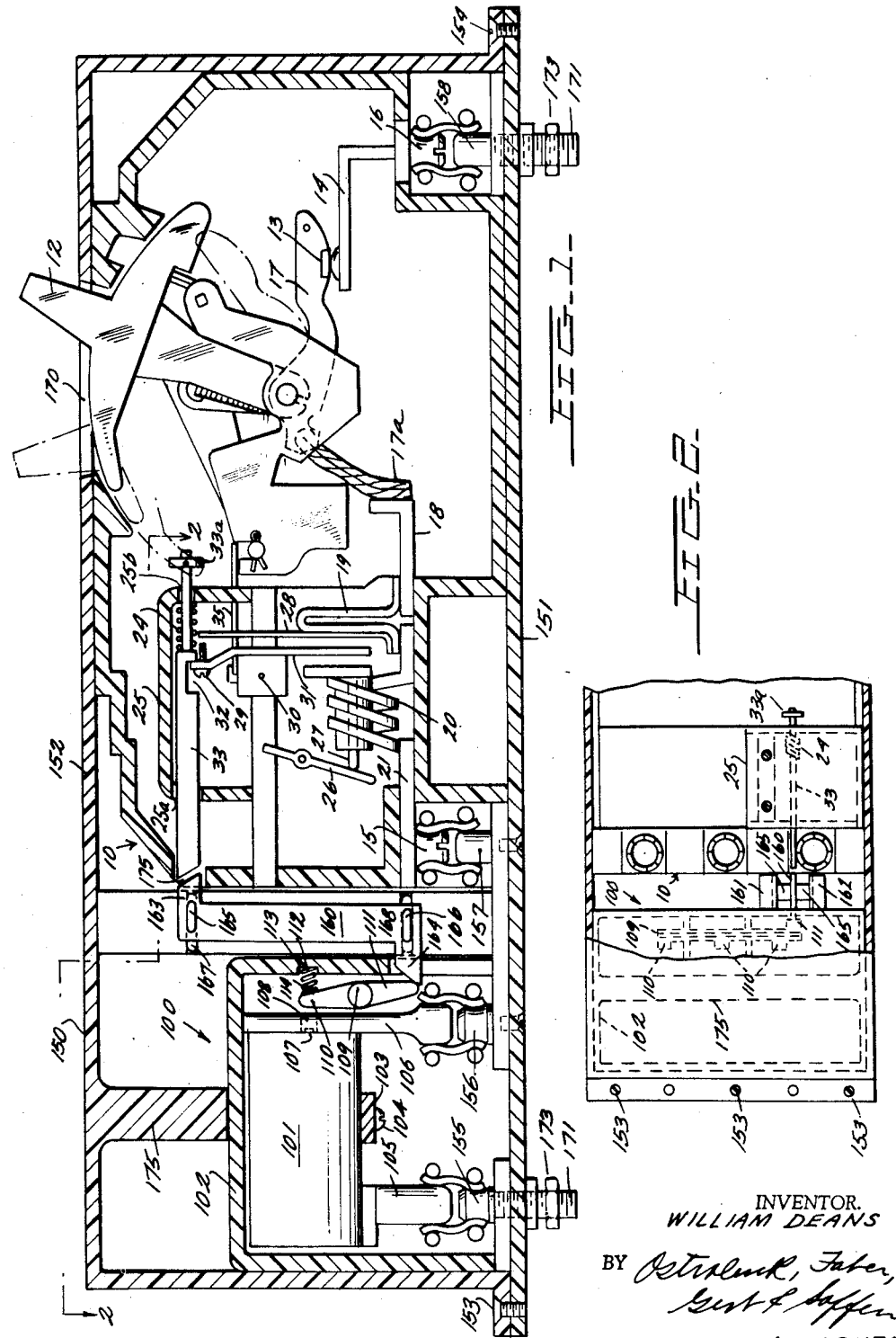

2,939,936
SEPARATE HOUSING FOR COORDINATED CIRCUIT BREAKER CURRENT LIMITING DEVICE

William Deans, Ridgewood, N.J., assignor to I-T-E Circuit Breaker Company, Philadelphia, Pa., a corporation of Pennsylvania Filed Oct. 1, 1957, Ser. No. 687,633

3 Claims. (Cl. 200—133)

This invention relates to a construction of a circuit interrupter wherein a circuit breaker and current limiting device are electrically and mechanically coordinated.

More particularly this invention relates to a construction wherein the separate housings are provided for the circuit breaker and current limiting device and a common housing is provided wherein the circuit breaker and current limiting device housings are removable disposed.

The manner in which electrical and mechanical cordination is achieved between a low voltage molded case circuit breaker and current limiter is disclosed in copending application Ser. No. 461,378, filed October 11, 1954, assigned to the assignee of the instant invention.

In essence, the electrical and mechanical coordination between a current limiting device and a circuit breaker enables a circuit breaker having a relatively low interrupting capacity to be used in an electrical circuit having an available short-circuit current in excess of the interrupting capacity of the circuit breaker itself. For all magnitudes of over-current and fault current within the range capable of being interrupted by the circuit breaker, the trip characteristics of the breaker are such that the time delay trip or the magnetic trip will initiate operation of the circuit breaker so that the cooperating contacts of all poles thereof are moved to the disengaged position. However, if a severe short-circuit should occur, the magnitude of which may exceed the interrupting rating of the circuit breaker, the current limiting device will rupture and thereby completely interrupt the fault current associated with the phase in which it occurred.

The coordination between the circuit breaker and the current limiting device may be such that they are mutually protecting thereby enabling both to be appreciably reduced in size. That is, the current limiter, as previously explained, protects the circuit breaker during short-circuit conditions and the tripping characteristics of the thermal and magnetic trip units of the circuit breaker are such that the circuit breaker will interrupt the circuit before fault currents have acted for a duration of time sufficient to damage a current limiting device of extremely compact construction.

In order to prevent single phasing and to provide an automatic disconnect switch in coordination with the current limiting device, mechanical coordination is provided whereby the rupture of the current limiting device will result in the simultaneous opening of the cooperating contacts of each pole of the circuit breaker.

Copending application Ser. No. 472,969, filed December 3, 1954, now Patent No. 2,888,535, sets forth an embodiment wherein a circuit breaker and current limiting device operating in accordance with the principles hereinbefore noted are housed in individual and removable housings. In that application the current limitng device is mounted on top of the circuit breaker with which it is coordinated.

It has been found that this construction leads to many undesirable features. By way of example, it is extremely difficult to gain access to the circuit breaker trip unit for calibration of thermal and instantaneous tripping.

Furthermore, the construction leads to a complex trip unit requiring many parts and seriously reduces accessibility to the circuit breaker operating handle. That is, it is very difficult to operate the circuit breaker operating handle when resetting the circuit breaker, this problem being particularly severe when the circuit interrupting device is mounted high on a switch board or wall.

A still further undesirable feature of the top mounting of current limiting devices is that the majority of the mechanical and electrical members connecting the devices will be exposed from the front of the switchboard front sheet when the current limiting device housing is removed.

In copending application Serial No. 622,042, filed November 14, 1956, and assigned to the assignee of the instant invention, the current limiting device is mounted to the end of the circuit breaker adjacent to the trip unit thereof. While this arrangement alleviates some of the disadvantages noted in connection with copending application Serial No. 472,969 many of these disadvantages remain to a limited extent. Even though the current limiting device is end mounted, it nevertheless extends above the top surface of the circuit breaker where it may interfere with the operation of the control handle.

In the instant invention a common housing having a first and second set of disconnect contacts internally thereof is provided. The circuit breaker and current limiting devices are each provided with individual housings and a set of disconnect contacts. Both the circuit breaker and current limiting device are removably insertable into the common housing with the sets of disconnect contacts providing the series electrical connection between the circuit breaker and current limiting device.

The circuit breaker may be of a standard type modified by including a trip rod in operative engagement with the circuit breaker common tripper bar and biased toward a position such that the tripper bar is in its tripped position. An auxiliary tripper bar is carried by the housing for the current limiting device and is biased in a first direction to a first position. Upon the rupturing of any of the fuses comprising the current limiting device a pin is released to engage the auxiliary tripping bar and move it against its bias to a second position.

When the circuit breaker and the current limiting device, in which none of the fuses thereof have ruptured, are both inserted into the common housing they are mechanically interconnected by means of a connecting link mounted in the common housing. In this position the trip rod bias is overcome by the bias of the auxiliary tripper bar so that the tripper bar is free to reset and thereafter the circuit breaker cooperating contacts may be brought into engagement.

If either the circuit breaker or current limiting device are partially or completely removed from the common housing, the tripper rod acting under the influence of its bias moves the tripper bar to its tripped position thus automatically bringing about the disengagement of the pairs of cooperating contacts of the circuit breaker. In this manner current interruption will never take place at the disconnect contacts.

The current limiting device in accordance with this invention extends no higher than the top of the circuit breaker so that the cover of the common housing may be flat so as not to interfere with the operation of the circuit breaker control handle which extends through an opening in the common housing cover.

Line and load connections are made directly to the disconnect contacts of the common housing. These connections need not be disturbed when it becomes necessary to replace the current limiter or circuit and to temporarily remove either for repair.

Accordingly, a primary object of the instant invention is to provide a common housing wherein the individual housings of an electrically and mechanically coordinated circuit breaker and current limiter are removably disposed.

Another object is to provide a common housing including convenient disconnect means for a circuit breaker and a current limiting device.

Still another object is to provide a common housing including a connecting link whereby a current limiting device and circuit breaker may be mechanically connected.

A further object is to provide an arrangement whereby the partial withdrawal from the common housing of either the current limiting device or the circuit breaker will automatically trip the latter open.

A still further object is to provide a common housing arrangement whereby the current limiter and/or circuit breaker may be withdrawn without disturbing the line or load connections to the combination thereby simplifying removal and replacement of the current limiter and circuit breaker.

These as well as other objects of this invention will become apparent after reading the following description of the accompanying drawings in which:

Figure 1 is a side cross sectional view taken through one pole unit of an electrically and mechanically coordinated circuit breaker and current limiter including individual housings both mounted in a common housing.

Figure 2 is a section taken through lines 2—2 of Figure 1 looking in the direction of arrows 2—2.

Referring to the figures, circuit breaker 10 is a multipole device of the conventional three pole type one of the substantially identical pole units of which is illustrated in Figure 1. Contained within housing 11 of circuit breaker 10 is an operating mechanism of any desired type such as that disclosed in U.S. Patent 2,574,093 wherein the control handle 12 operates a pair of cooperating contacts 13, 14 for each phase of pole unit of circuit breaker 10. The contacts of each phase are terminated by disconnect contacts 15, 16 which are of the tulip clip type, such as that described in copending application Ser. No. 536,586, filed September 26, 1955, and assigned to the assignee of the instant invention.

The current path through the circuit breaker phase of Figure 1 includes tulip clip 16, stationary contact 14, movable contact 13 carried by contact arm 17, pigtail 17a which connects contact arm 17 to conductor 18, heater 19, coil 20, conductor 21, and tulip clip 15.

Coil 20 has a pivotally mounted armature 26 and a plunger 27 associated therewith to comprise the magnetic trip unit. Heater 19 has bimetal 28 and calibrating screw 29 associated therewith to comprise the thermal trip unit. Screw 29 is carried by member 31 which is fastened to tripper bar 30 with screw 29 being in cooperating alignment with bimetal 28 which is itself aligned with plunger 27. Member 31 has one end thereof protruding into slot 32 of trip rod 33 and is rotatable in a counterclockwise direction within slot 32.

Operating mechanism 34 includes latch member 35 connected thereto and constructed to be latched by tripper bar 30. When tripper bar 30 is rotated in a counter clockwise direction, however, latch member 35 will be unlatched to allow mechanism 34 to disengage the circuit breaker cooperating contacts 13, 14 of each phase since mechanism 34 is common to all phases.

In the event of a prolonged overload of low magnitude, heater 19 will cause bimetal 28 to deflect into engagement with screw 29 and bring about counterclockwise rotation of tripper bar 30 thus tripping circuit breaker 10. Under fault conditions, coil 20 will create a magnetic field of sufficient intensity to attract armature 26 which drives plunger 27 into engagement with member 31, thus rotating tripper bar 30 counterclockwise to effect instantaneous tripping of circuit breaker 10.

Trip rod 33 is biased to the left by means of compression spring 24 which bears against bracket 25 and the enlarged section of trip rod 33. Bracket 25 includes openings 25a, 25b to journal the horizontal movement of trip rod 33 while cross member 33a limits the leftward travel of trip rod 33. Thus tripper bar 30 will always be rotated counterclockwise to trip circuit breaker 10 unless trip rod 33 is positioned to the right against the biasing force of spring 24. The manner in which trip rod 33 is positioned to the right will be hereinafter fully explained.

Current limiting device 100 includes an individual fuse 101 for each pole unit of circuit breaker 10. Fuses 101 are maintained in housing 102 by plate 103 which is fastened to housing 102 by fasteners 104. Disconnect studs 105, 106 extend laterally from the ends of fuse 101. As may be seen in previously noted copending application Ser. No. 472,969, each fuse 101 is provided with a striker pin 107 which is ejected from the respective fuse 101 upon operation thereof. Striker pin 107 is positioned to pass through cooperating aperture 108 of disconnect contact 106.

An auxiliary tripper bar 109 is pivotally mounted in housing 102 and carries an individual extension 110 for each of the fuses 101. Extensions 110 are operatively positioned to be engaged by striker pins 107 upon operation of the respective fuses 101. A further extension 111 is secured to auxiliary tripper bar 57. Compression spring 112 rests in housing recess 113 and surrounds projection 114 extending from one of the extensions 110 to thereby bias auxiliary tripper bar 109 in a counterclockwise direction.

Common housing 150 includes a base 151 and a cover 152 secured thereto by means of fasteners 153, 154. Base 151 and cover 152 are preferably constructed of a molded insulating material. A pair of tulip type connectors 155, 156 are secured to base 151 for each fuse 101 and are longitudinally spaced to receive studs 105, 106 respectively of the fuses 101. Similarly studs 157, 158 are secured to base 151 and longitudinally spaced to receive tulip connectors 15, 16 of circuit breaker 10. Individual connector straps electrically connect one of the studs 157 to a tulip connector 156 so that fuses 101 and the pole units of circuit breaker 10 are connected in electrical series when circuit breaker 10 and current limiter 100 are both inserted in common housing 150. Suitable insulating barriers (not shown) may be interposed between the base disconnect contacts to prevent phase to phase flashover.

Threaded studs 171, 172 extend through base 151 and together with nuts 173, 174 provide connecting means for the line and load conductors respectively. With the line and load connections made to studs 171, 172, circuit breaker 10 and/or current limiter 100 may be removed for repair and replacement without disturbing either the lines or load connections.

The mechanical coordination between circuit breaker 10 and current limiter 100 is achieved by means of connecting link 160 which is slidably mounted to posts 161, 162 secured to base 151. One end 163 of link 160 projects to the right and is in alignment with trip rod 33 while the other end 164 projects to the left and is in alignment with auxiliary tripper bar extension 111. Upper 165 and lower 166 projections extend from both sides of link 160 and nest within upper 167 and lower 168 slots respectively cut in both posts 161, 162.

Common housing cover 152 includes an opening 170 through which circuit breaker operating handle 12 projects so that it may be operated externally of common housing 150. Clearly, the flat top surface of cover 152 provides clear access to handle 12 and permits unobstructed operation thereof. The inner surface of cover 152 is flush with the top of circuit breaker housing 11 while projection 175 extends inward from the top of cover 152 to prevent any movement of current limiting device 100. If it is desired to parallel fuses 101 with resistors (not shown), as in previously mentioned application Ser. No. 603,734, projection 175 may be removed and current limiter housing 102 extended upward to accommodate these resistors.

With both circuit breaker 10 and current limiter 100 having their disconnect contacts entirely mated with the disconnect contacts mounted to base 151 trip rod 33 will be positioned to the right to permit tripper bar 30 to assume a reset position thereby permitting cooperating contacts 13, 14 to be operated into engagement. That is, spring 112 exerts a greater force than spring 24 so that extension 111 is in its clockwise position which forces link end 164 to the right. Link 160 is thereby forced to the right together with end 163 which extends through circuit breaker opening 175 to engage and hold trip rod 33 to its right-most position. It should be apparent that trip rod 33 will be moved to its left-most position by spring 24 and thereby trip circuit breaker 10 as either circuit breaker 10 or current limiter 100 are removed from common housing 150. It should also be apparent that the lengths of the cooperating disconnect contacts and the placement of posts 161, 162 will enable trip rod 33 to move to the left before any of the disconnect contacts have parted.

When any one of the fuses 101 are ruptured by the occurrence of a short circuit current the striker pin 107 of the ruptured fuse will be ejected against its associated extension 110. This will rotate auxiliary tripper bar 109 clockwise against the force of spring 112 and move extension 111 to the left. Connecting link 160 is no longer subjected to a rightward force so that it is free to move to the left as trip rod 33 moved to the left under the influence of spring 24. Tripper bar 30 is thereby rotated counterclockwise to trip all phases of circuit breaker 10 and prevent single phasing.

In the foregoing description, current limiting device 100 has been described as being connected on the line side of circuit breaker 10. This arrangement prevents phase to phase flashover within circuit breaker 10 when circuit interruption is due to the rupturing of a fuse element as fully explained in copending application Serial No. 622,952, filed November 19, 1956, now Patent No. 2,863,969 and assigned to the assignee of the instant invention.

However, as a safety measure, current limiting device 100 may be placed on the load side of the circuit breaker if the latter is supplied with suitable barrier means to internally isolate the circuit breaker phases. In this arrangement the circuit breaker acts as a disconnect switch and automatically prevents exposure of personnel to energized disconnect contacts for the current limiting device. Since the current limiting device is more often removed from common housing 150 than the circuit breaker, the latter arrangement appears more desirable provided the circuit breaker includes suitable internal phase isolating means to prevent phase to phase flashover.

Thus I have provided an arrangement for an electrically and mechanically coordinated circuit breaker and current limiting device wherein each includes an individual housing. Still another housing or common housing is provided wherein the circuit breaker and current limiting device are removably mounted for convenient removal for repair or replacement.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. The combination of a common housing and a circuit interrupter and a first means each removably disposed within said common housing; said circuit interrupter including a first housing and a plurality of pole units disposed therein; said first means including a second housing and at least one current limiting fuse disposed therein; said fuses being equal in number to said pole units; said circuit interrupter also including a second means operable to a first and a second position; said second means being operatively positioned when in said first position to permit simultaneous operation of said pole units between an open and a closed position and when in said second position to prevent operation of said pole units to said closed position and if said pole units are in said closed position to automatically simultaneously move all of said pole units to said open position; a third means coordinating said circuit interrupter and said first means so that the rupturing of any one of said fuses will operate said second means to said second position; said circuit interrupter and said first means each including a set of disconnect contacts; a first and a second set of disconnect contacts secured to said common housing and operatively positioned for removable cooperative engagement by said sets of contacts of said first means and said circuit interrupter respectively; one half of said disconnect contacts of said first set being electrically connected to individual disconnect contacts of one half of said second set; said other halves of said first and second sets of disconnect contacts including a fourth means adapted to receive line and load conductors; all of said pole units being moved automatically and simultaneously to said open position upon removal of at least one of said circuit interrupter and said first means from said common housing but before any of said cooperating disconnect contacts have become disengaged; the upper surface of said second housing adjacent the upper surface of said common housing being at most no higher than the upper surface of said first housing adjacent the upper surface of said common housing whereby said upper surface of said common housing may be flat and connected immediately adjacent said upper surface of said first housing.

2. The combination of a common housing and a circuit interrupter and a first means each removably disposed within said common housing; said circuit interrupter including a first housing and a plurality of pole units disposed therein; said first means including a second housing and at least one current limiting fuse disposed therein; said fuses being equal in number to said pole units; said circuit interrupter also including a second means operable to a first and a second position; said second means being operatively positioned when in said first position to permit simultaneous operation of said pole units between an open and a closed position and when in said second position to prevent operation of said pole units to said closed position and if said pole units are in said closed position to automatically simultaneously move all of said pole units to said open position; a third means coordinating said circuit interrupter and said first means so that the rupturing of any one of said fuses will operate said second means to said second position; said circuit interrupter and said first means each including a set of disconnect contacts; a first and a second set of disconnect contacts secured to said common housing and operatively positioned for removable cooperative engagement by said sets of contacts of said first means and said circuit interrupter respectively; one half of said disconnect contacts of said first set being electrically connected to individual disconnect contacts of one half of said second set; said other halves of said first and second sets of disconnect contacts including a fourth means adapted to receive line and load conductors; all of said pole units being moved automatically and simultaneously to said open position upon removal of at least one of said circuit interrupter and said first means from said common housing but before any of said cooperating disconnect contacts have become disengaged; said first means including an auxiliary tripper bar having a plurality of in line extensions, equal in number to said fuses, extending therefrom; an out of line extension secured to said auxiliary tripper bar; said circuit interrupter including a trip rod in operative engagement with said second means; said third means including a connecting link operatively mounted and positioned with said common housing; one end of said link extending in a first direction into operative engagement with said trip rod and the other end of said link extending in a direction opposite to said first direction into operative engagement with said out of line extension; a first biasing means urging said trip rod to move said second means to said second position and also urging said trip rod into engagement with said link; a second biasing means of greater force than said first biasing means urging said out of line extension into engagement with said link and thereby moving said trip rod against its bias to permit said second means to move to said first position; each of said fuses having a pin; said pin being ejected from said fuse upon the rupturing thereof; said pin when ejected engaging one of said in line extensions and moving said out of line extension away from said link to thereby permit said trip rod to move said secod means to said second position; the upper surface of said second housing adjacent the upper surface of said common housing being at most no higher than the upper surface of said first housing adjacent the upper surface of said common housing whereby said upper surface of said common housing may be flat and connected immediately adjacent said upper surface of said first housing.

3. In combination; a circuit breaker housing, a current limiting fuse housing and a common housing; said circuit breaker housing having an operating handle extending from the upper surface thereof; said current limiting fuse housing being removably connected to an extended base of said circuit breaker housing; said current limiting fuse housing and said circuit breaker housing being positioned at the bottom of said common housing; the upper surface of said current limiting fuse housing being coplanar with or below the said upper surface of said circuit breaker housing; the upper surface of said common housing having an aperture therein aligned with said extending operating handle of said circuit breaker housing; the upper surface of said common housing being flat and being positioned immediately adjacent the said upper surface of said circuit breaker housing and having said operating handle of said circuit breaker housing extending through said aperture in said upper surface of said common housing.

References Cited in the file of this patent

UNITED STATES PATENTS

| | | |
|---|---|---|
| 826,888 | Sachs | July 24, 1906 |
| 1,288,820 | Braunworth | Dec. 24, 1918 |
| 2,087,886 | Frank | July 27, 1937 |
| 2,473,196 | Dannenberg | June 14, 1949 |
| 2,491,959 | Dyre | Dec. 20, 1949 |
| 2,666,824 | Dorfman | Jan. 19, 1954 |
| 2,846,545 | Edmunds | Aug. 5, 1958 |
| 2,863,969 | Edmunds | Dec. 9, 1958 |